United States Patent
Chen et al.

(10) Patent No.: US 9,207,418 B2
(45) Date of Patent: Dec. 8, 2015

(54) PARTIALLY IMPREGNATED, FIBER REINFORCED THERMOPLASTIC STRENGTH MEMBER

(75) Inventors: Buo Chen, Hillsborough, NJ (US); Jeroen Van Poucke, Lokeren (BE)

(73) Assignee: Dow Global Technologies LLC, Midland, MI (US)

( * ) Notice: Subject to any disclaimer, the term of this patent is extended or adjusted under 35 U.S.C. 154(b) by 184 days.

(21) Appl. No.: 13/699,214

(22) PCT Filed: May 23, 2011

(86) PCT No.: PCT/US2011/037517
§ 371 (c)(1),
(2), (4) Date: Nov. 20, 2012

(87) PCT Pub. No.: WO2011/156122
PCT Pub. Date: Dec. 15, 2011

(65) Prior Publication Data
US 2013/0071076 A1    Mar. 21, 2013

Related U.S. Application Data

(60) Provisional application No. 61/352,571, filed on Jun. 8, 2010.

(51) Int. Cl.
*G02B 6/44* (2006.01)
*B29B 15/12* (2006.01)

(52) U.S. Cl.
CPC ............ *G02B 6/4401* (2013.01); *B29B 15/122* (2013.01); *G02B 6/4434* (2013.01)

(58) Field of Classification Search
CPC .................................................... G02B 6/4434
See application file for complete search history.

(56) References Cited

U.S. PATENT DOCUMENTS

| 4,269,024 | A | | 5/1981 | Ashpole et al. | |
|---|---|---|---|---|---|
| 4,659,174 | A | * | 4/1987 | Ditscheid et al. | 385/113 |
| 4,743,085 | A | * | 5/1988 | Jenkins et al. | 385/113 |
| 4,770,489 | A | * | 9/1988 | Saito et al. | 385/113 |

(Continued)

FOREIGN PATENT DOCUMENTS

| GB | 1438074 A | * | 6/1976 | ............... G02B 5/16 |
|---|---|---|---|---|
| JP | S58-216205 A | | 12/1983 | |

(Continued)

OTHER PUBLICATIONS

International Preliminary Report on Patentability for PCT App. No. PCT/US2011/037517 mailed on Sep. 19, 2012.

(Continued)

*Primary Examiner* — Michelle R Connelly
(74) *Attorney, Agent, or Firm* — Whyte Hirschboeck Dudek S.C.

(57) ABSTRACT

Fiber bundles (10) comprise loose fibers (11) encased within a fiber/resin composite (12). The bundles are useful as strength members for fiber optic cables. In one embodiment the bundles are prepared by a method comprising the steps of (A) bundling fibers together such that a portion of the fibers form an interior part of the bundle and a portion of the fibers form an exterior part of the bundle, and (B) impregnating the exterior part of the bundle with a resin such that (1) the fibers that form the exterior part of the bundle and the resin form a fiber/resin composite that encases the fibers that for the interior part of the bundle, and (2) the fibers that form the interior part of the bundle are not impregnated with the resin.

7 Claims, 3 Drawing Sheets

(56) References Cited

U.S. PATENT DOCUMENTS

| | | | |
|---|---|---|---|
| 4,892,382 A * | 1/1990 | Story et al. | 385/102 |
| 5,013,127 A * | 5/1991 | Bernard | 385/107 |
| 5,101,467 A * | 3/1992 | Bernard | 385/112 |
| 5,148,509 A * | 9/1992 | Kannabiran | 385/109 |
| 5,229,851 A * | 7/1993 | Rahman | 385/114 |
| 5,246,783 A | 9/1993 | Spenadel et al. | |
| 5,272,236 A | 12/1993 | Lai et al. | |
| 5,278,272 A | 1/1994 | Lai et al. | |
| 5,619,606 A * | 4/1997 | Bonicel | 385/102 |
| 5,636,307 A * | 6/1997 | Cowen et al. | 385/102 |
| 5,734,773 A * | 3/1998 | Teshima et al. | 385/126 |
| 5,986,028 A | 11/1999 | Lai et al. | |
| 5,989,376 A | 11/1999 | Kusy et al. | |
| 6,496,629 B2 | 12/2002 | Ma et al. | |
| 6,519,397 B2 * | 2/2003 | Priest et al. | 385/109 |
| 6,654,525 B2 | 11/2003 | Nechitailo et al. | |
| 6,714,707 B2 | 3/2004 | Rossi et al. | |
| 6,901,192 B2 | 5/2005 | Wells | |
| 7,010,201 B2 * | 3/2006 | Risch | 385/100 |
| 7,346,244 B2 | 3/2008 | Gowan et al. | |
| 7,355,089 B2 | 4/2008 | Chang et al. | |
| 7,603,011 B2 | 10/2009 | Varkey et al. | |
| 7,815,995 B2 | 10/2010 | Clark et al. | |
| 8,275,225 B2 * | 9/2012 | Kachmar et al. | 385/104 |
| 8,571,369 B2 * | 10/2013 | Tatat | 385/111 |
| 2004/0050579 A1 * | 3/2004 | Hager et al. | 174/116 |
| 2004/0175556 A1 | 9/2004 | Clark et al. | |
| 2004/0191472 A1 | 9/2004 | Adolps | |
| 2006/0260739 A1 | 11/2006 | Varkey | |
| 2009/0156714 A1 * | 6/2009 | Narayan et al. | 524/81 |
| 2010/0075144 A1 * | 3/2010 | Davies | 428/375 |
| 2011/0268400 A1 * | 11/2011 | Lovie et al. | 385/113 |
| 2013/0112342 A1 * | 5/2013 | Hager et al. | 156/185 |

FOREIGN PATENT DOCUMENTS

| | | |
|---|---|---|
| JP | 07173778 | 7/1995 |
| JP | 2000-154045 A | 6/2000 |
| WO | 9628258 | 9/1996 |
| WO | 2004087410 A1 | 10/2004 |

OTHER PUBLICATIONS

International Search Report for PCT App. No. PCT/US2011/037517 mailed on Aug. 29, 2011.

* cited by examiner

PARTIALLY IMPREGNATED, FIBER REINFORCED THERMOPLASTIC STRENGTH MEMBER

CROSS REFERENCE TO RELATED APPLICATION

The present application is the national phase of PCT Patent Application No. PCT/US2011/037517 filed May 23, 2011, which claims the benefit of U.S. Ser. No. 61/352,571, filed Jun. 8, 2010. The entire content of which is incorporated by reference herein.

BACKGROUND OF THE INVENTION

1. Field of the Invention

This invention relates to wire and cable. In one aspect the invention relates to a strength member of a wire or cable while in another aspect, the invention relates to a strength member that is fiber reinforced. In yet another aspect the invention relates to a process for making a fiber reinforced strength member while still in another aspect, the invention relates to wire and cable comprising a fiber reinforced strength member.

2. Description of the Related Art

Fiber-optic cable is a complex structure designed to provide sufficient protection for the fibers from detrimental levels of longitudinal and transverse stresses. In addition, the structure also provides a benign chemical and physical environment for the service life of the fibers. One fundamental difference between fiber-optic cable and electrical power cable is that the metal conductors in a power cable carry at least portion of the tensile stresses created during installation and in-service conditions. In contrast, fiber-optic cables contain tensile strength members integrated into the cable specifically to isolate the fibers from tensile stresses. Sufficient tensile and compressive strength, ability to withstand small radius bend, easy fiber handling and cable installation, and competitive cost are a few criteria among the list that must be considered when designing a fiber-optic cable.

Many types of designs are available for fiber-optic cables, the design of choice dependent upon the application. Whatever the choice, all require some type of strength members to carry the tensile and compressive stresses of the cable during both installation and in-service use.

The strength members in use today are made mainly of fiber reinforced plastic (FRP, which is also known as glass reinforced plastic (GRP) if glass fiber is the reinforcement) or stainless steel. Traditionally, FRP or GRP is manufactured through a fiber pultrusion process with one or more thermoset resins such as vinyl ester or epoxy, but the speed of process is very limited. As for stainless steel, it is relatively expensive and heavy. In addition, the GRP or FRP/thermoset resin composites available today tend to have excessive stiffness, and this makes installation of fiber optic cable comprising these strength members difficult, especially around buildings or along busy city streets where sharp bending of the cable is often necessary.

SUMMARY OF THE INVENTION

In one embodiment the invention is a fiber bundle comprising loose fibers encased within a fiber/resin composite. In one embodiment the fiber bundle is an extruded article of indefinite length. In one embodiment the fibers comprise at least one of glass, carbon, polyester and aramid. In one embodiment the resin component of the fiber/resin composite is a polyolefin. In one embodiment the average thickness of the collection of loose fibers encased with the composite is at least 1/10th of the diameter of the fiber bundle. In one embodiment the average thickness of the fiber/resin composite is at least 1/3rd of the radius of the fiber bundle.

In one embodiment the invention is a cable or other structure comprising a fiber bundle, the bundle comprising loose fibers encased within a fiber/resin composite. In one embodiment the cable is a fiber optic cable.

In one embodiment the invention is a method of making a fiber bundle, the method comprising the steps of (A) bundling fibers together such that a portion of the fibers form an interior part of the bundle and a portion of the fibers form an exterior part of the bundle, and (B) impregnating the exterior part of the bundle with a resin such that (1) the fibers that form the exterior part of the bundle and the resin form a fiber/resin composite that encases the fibers that for the interior part of the bundle, and (2) the fibers that form the interior part of the bundle are not impregnated with the resin. In one embodiment the fiber bundle is processed by passing a loose fiber bundle (comprising, but not limited to, at least one of glass, carbon, polyester and aramid fibers) through a wire jacket extrusion line, and applying a thermoplastic resin (e.g., polypropylene or polyethylene) to the fiber bundle in any convenient manner. The fibers are only partially impregnated inside the extruder, and most of the impregnated fibers are located on the outer layer of the bundle. After the bundle exits the extrusion die and cools, a "hard shell" composite is formed on the outer surface of the bundle, and this shell layer tightly encloses the remaining unimpregnated or only lightly impregnated fibers in the center.

The fiber bundle of this invention exhibits reduced bending stiffness and improved manufacturing efficiency as compared to a fiber bundle that is completely impregnated with resin and is thus without loose fibers within the interior of the bundle. The fiber bundles of this invention serve as useful strength members for fiber optic cables and other wire and cable applications. Both the fibers in the shell composite and in the center contribute to the tensile strength of the bundle, but compressive strength and bending stiffness of the bundle is provided only by the outer layer fiber/resin composite. The fiber bundle can exhibit one or more of the following features:

1. If prepared by extrusion, the cross-section geometries of the bundle can be varied on demand through the design of the flow mechanics and extrusion die.
2. Since the compressive strength of the fiber bundle is determined by the fiber/resin composite shell, variation in the shell thickness will vary the compressive strength of the bundle. Through one or more of the formulation of the resin, control of the extrusion head pressure, and control of the line speed, the thickness of the outer composite shell layer can be varied according to the needs of the application to which the bundle is applied.
3. By adjusting the volume ratio between the bundle fiber/resin composite layer and the center loose fibers, the bending and torsion stiffness of the bundle can also be tailored according to the needs of the application to which the bundle is applied. More volume in the composite shell means more stiffness to the bundle (both in bending and torsion).
4. Water blocking coatings can be added to the fibers (especially the fibers in the center) to enhance the water blocking characteristics of the fiber bundle.
5. Wire jacket extrusion lines have much higher line speeds, e.g., >10×, as to compared to traditional fiber pultrusion processes. Consequently, the manufacturing efficiency is greatly enhanced.

6. Crosslinking techniques, such as moisture curing, may be used along the extrusion process to lightly crosslink the matrix if high heat resistance is desired for an application.

In one embodiment the fiber bundles of this invention are used as replacement strength members in fiber optic cables for conventional FRP/GRP strength members so as to provide improved flexibility to the cable. However, the fiber bundles of this invention may also be used in other applications in which high tensile modulus in one direction is desired.

DETAILED DESCRIPTION OF THE PREFERRED EMBODIMENT

Definitions

Figure 1:
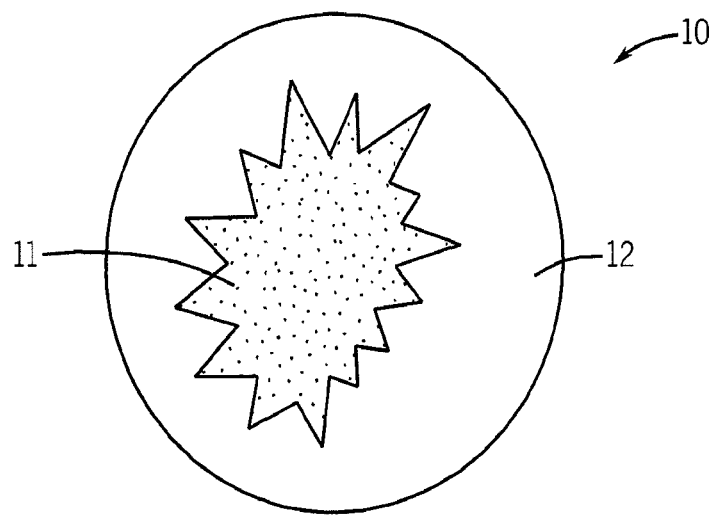
FIG. 1 is a schematic cross-cut of a fiber bundle embodiment of the invention.

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, thickness, etc., is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the component amounts of formulations, thickness, etc.

"Filament" and like terms mean a single, continuous strand of elongated material having a length to diameter ratio of greater than 10.

"Fiber" and like terms mean an elongated column of entangled filament having a generally round cross-section and a length to diameter ratio greater than 10.

"Cable" and like terms means at least one wire or optical fiber within a protective jacket or sheath. Typically, a cable is two or more wires or optical fibers bound together, typically in a common protective jacket or sheath. The individual wires or fibers inside the jacket may be bare, covered or insulated. Combination cables may contain both electrical wires and optical fibers. The cable, etc., can be designed for low, medium and high voltage applications. Typical cable designs are illustrated in U.S. Pat. Nos. 5,246,783, 6,496,629 and 6,714,707.

"Encased" and like terms mean, in the context of a fiber bundle, that fibers in the middle of the bundle are surrounded by a fiber/resin composite.

"Average thickness" and like terms mean, in the context of the fiber/resin composite component of a fiber bundle, the thickness of the composite component of the bundle as determined by measuring the thickness of the composite by any suitable means in two or more locations about the bundle, and then dividing the sum of the measurements by the number of measurements made. "Average thickness" and like terms mean, in the context of the loose fibers component of a fiber bundle, the thickness of the loose fibers component of the bundle as determined by measuring the thickness of the loose fibers component by any suitable means in two or more locations within the bundle, and then dividing the sum of the measurements by the number of measurements made.

Fiber

Various kinds of fiber can be used in the practice of this invention including, but not limited to, polyolefin, e.g., polyethylene and polypropylene fiber, nylon fiber, polyester fiber, glass fiber, graphite fiber, quartz fiber, metal fiber, ceramic fiber, boron fiber, aluminum fiber, and combinations of two or more of these or other fibers. Fiber is typically available as yarn or roving which is a bundle of individual filaments on a spool. The denier of the fiber can vary to the composition of the fiber and the application to which the fiber bundle is placed, but typically it is between 400 and 5,000 TEX, more typically between 600 and 3,000 TEX, and even more typically between 700 and 2,500 TEX.

Representative polyolefin fibers include SPECTRA® 900 polyethylene fiber from Honeywell, DOW XLA™ polyolefin fibers. Representative glass fibers include Owens Corning's E-glass fibers OC® SE 4121 (1200 or 2400 Tex), and John Manville JM 473AT (2400 tex), 473A (2400 and 1200 tex), PPG 4599 (2400 tex). OC® SE 4121 is an advanced member of the Single-End Continuous Rovings (Type 30) family. This product is specially designed for use in polypropylene long-fiber thermoplastic (LFT) applications. OC SE 4121 has a chemistry that is designed to be suitable with Direct-LFT processes.

The amount of fiber in the fiber bundle is typically at least 20, more typically at least 60 and even more typically at least 80, weight percent (wt %) based on the weight of the bundle. The maximum amount of fiber in the fiber bundle typically does not exceed 98, more typically does not exceed 98 and even more typically does not exceed 90, wt % based on the weight of the bundle.

Impregnating Resin

Various kinds of commercially available thermoplastic resins can be used in the practice of this invention including, but not limited to, those resins commonly known and used for forming fiber-reinforced polymeric plastic. Typical thermoplastic resins include, but are not limited to, acrylic resin, acrylate resin, epoxy resin, carbonate resin, polyolefin resin and combinations of two or more of these and/or other resins.

The polyolefin resins useful in the practice of this invention are thermoplastic, and include both polyolefin homopolymers and interpolymers. Examples of polyolefin homopolymers are the homopolymers of ethylene and propylene.

Examples of the polyolefin interpolymers are the ethylene/α-olefin interpolymers and the propylene/α-olefin interpolymers. The α-olefin is preferably a $C_{3-20}$ linear, branched or cyclic α-olefin (for the propylene/α-olefin interpolymers, ethylene is considered an α-olefin). Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, are α-olefins and can be used in place of some or all of the α-olefins described above. Similarly, styrene and its related olefins (for example, α-methylstyrene, etc.) are α-olefins for purposes of this invention. Illustrative polyolefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene. The copolymers can be random or blocky.

The polyolefin resins can also comprise one or more functional groups such as an unsaturated ester or acid, and these polyolefins are well known and can be prepared by conventional high-pressure techniques. The unsaturated esters can be alkyl acrylates, alkyl methacrylates, or vinyl carboxylates. The alkyl groups can have 1 to 8 carbon atoms and preferably have 1 to 4 carbon atoms. The carboxylate groups can have 2 to 8 carbon atoms and preferably have 2 to 5 carbon atoms. The portion of the copolymer attributed to the ester comonomer can be in the range of 1 up to 50 percent by weight based on the weight of the copolymer. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. Examples of the unsaturated acids include acrylic acids or maleic acids.

Functional groups can also be included in the polyolefin through grafting which can be accomplished as is commonly known in the art. In one embodiment, grafting may occur by way of free radical functionalization which typically includes melt blending an olefin polymer, a free radical initiator (such as a peroxide or the like), and a compound containing a functional group. During melt blending, the free radical initiator reacts (reactive melt blending) with the olefin polymer to form polymer radicals. The compound containing a functional group bonds to the backbone of the polymer radicals to form a functionalized polymer. Exemplary compounds containing functional groups include but are not limited to alkoxysilanes, e.g., vinyl trimethoxysilane, vinyl triethoxysilane, and vinyl carboxylic acids and anhydrides, e.g., maleic anhydride.

More specific examples of polyolefins useful in this invention include very low density polyethylene (VLDPE) (e.g., FLEXOMER® ethylene/1-hexene polyethylene made by The Dow Chemical Company), homogeneously branched, linear ethylene/α-olefin copolymers (e.g. TAFMER® by Mitsui Petrochemicals Company Limited and EXACT® by Exxon Chemical Company), homogeneously branched, substantially linear ethylene/α-olefin polymers (e.g., AFFINITY® and ENGAGE® polyethylene available from The Dow Chemical Company), and olefin block copolymers such as those described in U.S. Pat. No. 7,355,089 (e.g., INFUSE® available from The Dow Chemical Company). The more preferred polyolefin copolymers are the homogeneously branched linear and substantially linear ethylene copolymers. The substantially linear ethylene copolymers are especially preferred, and are more fully described in U.S. Pat. Nos. 5,272,236, 5,278,272 and 5,986,028.

The polyolefins useful in the practice of this invention also include propylene, butene and other alkene-based copolymers, e.g., copolymers comprising a majority of units derived from propylene and a minority of units derived from another α-olefin (including ethylene). Exemplary propylene polymers useful in the practice of this invention include the VERSIFY® polymers available from The Dow Chemical Company, and the VISTAMAXX® polymers available from ExxonMobil Chemical Company.

Blends of any of the above olefinic elastomers can also be used in this invention, and the olefin elastomers can be blended or diluted with one or more other polymers to the extent that, in a preferred mode, the olefin elastomers of this invention constitute at least about 50, preferably at least about 75 and more preferably at least about 80, weight percent of the thermoplastic polymer component of the blend and retain their flexibility. In a less preferred mode and depending on other properties that may be sought, the olefin elastomer content may be less than 50% of the thermoplastic polymer component. In one embodiment the impregnating resin is INSPIRE® 404 or DOW® H734-52RNA performance polymer (polypropylene) both available from The Dow Chemical Company, or similar grades of polypropylene resin available from other suppliers.

The resins used in the practice of this invention can include one or more additive to facilitate their processing and/or use. Typical additives include compatibility/coupling agents, e.g., FUSABOND® P353 by DuPont or OREVAC® CA 100 by Arkema or POLYBOND® 3200 by Chemtura; flow promoters, e.g., Borealis BORFLOW® 405 or 805 or Dow AFFINITY® GA 1950; pigment, e.g., Hubron Black Masterbatch PPB or Cabot PLASBLAK® 4045; and antioxidants, e.g., IRGANOX® 1010, IRGAFOS® 168 and/or IRGANOX® PS 802 (as supplied by Ciba Specialty Chemicals). These and other additives are used in conventional amounts and in conventional ways.

The amount of resin (including any additives and/or fillers) in the fiber bundle is typically at least 3, more typically at least 5 and even more typically at least 8, weight percent (wt %) based on the weight of the bundle. The maximum amount of resin in the fiber bundle typically does not exceed 80, more typically does not exceed 60 and even more typically does not exceed 40, wt % based on the weight of the bundle. For higher concentrations of resin in the bundle, and thus a thicker hard or outer shell, i.e., composite, the line speed of the extruder is slowed to allow the resin more time to penetrate the bundle.

Method of Making the Fiber Bundle

In one embodiment any wire jacket line currently used in wire jack extrusion may be used in the practice of this invention. These lines offer great flexibility for cable manufacturers because of the availability of the equipment. Typically the resins are formulated with all the components by direct compounding at the front end of the extruder. Multiple meter feeders can be used to feed the resin and additives into the extruder. Extruder screws may be set with a compression ratio larger than 2.5:1. Mixing elements in the screws should be used if appropriate, and typically only minimum mixing elements are required. The chamber temperatures are typically set at 100-220° C. for the different zones in the extruder, and the die temperature is typically the highest of all of the zones. The extrusion speed is typically 3-15 feet per minute depending on the diameter of the fiber. The principal determinant of line speed is the desired depth of impregnation. The resin typically penetrates on average at least one third of the radius measured from the outer circumference of the fiber (or if of a cross-section other than circular, then the equivalent of ⅓ the radius), and typically no more than an average of ½ of the radius of measured from the outer circumference.

Fiber Bundle Specifications

FIG. 1 illustrates a cross-section of a fiber bundle of this invention. Bundle 10 comprises loose fibers 11 encased in fiber/resin composite 12. As shown in FIG. 1, the thickness of composite 12 is not necessarily uniform about loose fibers 11. Typically all, or essentially all, of the fibers in the composite are continuous so as to maximize the modulus of the bundle. The average thickness of the fiber/resin composite can vary, but typically it is at least ⅓ of the radius of the fiber bundle. The thicker the composite, the less flexible the bundle. The center of the bundle comprises fibers that have not been, or only minimally, impregnated with the resin and thus are not attached to one another through a matrix of the resin.

To function as a strength member in a fiber optic cable, typically the fiber bundle will have one or more of the following properties:

1. Modulus of at least 49 gigaPascals (GPa). The high modulus is a function of fiber loadings (glass fiber), and adhesion between the fiber and matrix.
2. Fiber is continuous within the composite. In order to reach the high modulus requirement, typically at least 95% of the fibers must be continuous in the composite.
3. Fibers are oriented in the longitudinal direction of the bundle.
4. The fiber/resin composite comprises at least ⅓ of the radius of the fiber bundle measured from the outer circumference.
5. Strong adhesion between the resin and fibers of the composite.

Figure 4:
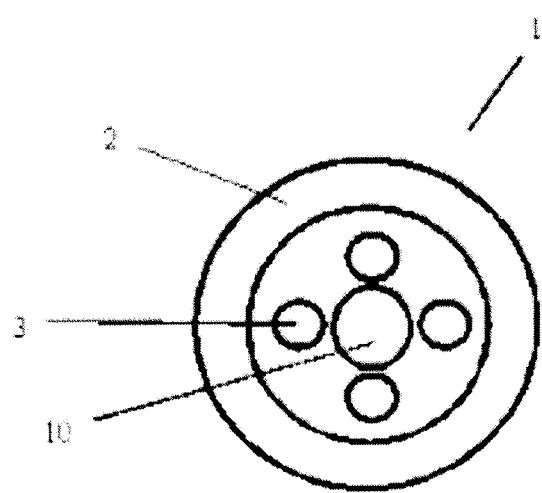
FIG. 4 is a cross-section of a cable including a fiber bundle embodiment of this invention.

FIG. 4 is a cross-section of a cable 1 including a fiber reinforced strength member 10, optical fibers or optical fiber bundles 3, and cable coating 2. The optical fibers 3 are not contained within the circumference of the strength member 10.

The invention is described more fully through the following examples. Unless otherwise noted, all parts and percentages are by weight.

Specific Embodiments

Materials

The fiber is SPECTRA® 900, an ultra high molecular weight polyethylene yarn of 1,200 denier and 120 filament available from Honeywell. The melting temperature of the fiber is 150° C. and other properties of the fiber are reported in Table 1.

The resin is ENGAGE® 8200EG polyolefin elastomer, an ethylene-octene copolymer with a density of 0.870 g/cc, a melt index of 5 g/10 min, a melt point of 60° C. and available from The Dow Chemical Company.

TABLE 1

Properties of SPECTRA ® 900 Fiber

| Weight/Unit Length (Denier) | 650 | 1200 | 4800 |
|---|---|---|---|
| (Decitex) | 722 | 1333 | 5333 |
| Ultimate Tensile Strength (g/den) | 30.5 | 30 | 25.5 |
| (Gpa) | 2.6 | 2.57 | 2.18 |
| Breaking Strength (lbs.) | 44 | 79 | 270 |
| Modulus (g/den) | 920 | 850 | 885 |
| (Gpa) | 79 | 73 | 75 |
| Elongation (%) | 3.6 | 3.9 | 3.6 |
| Density (g/cc) | 0.97 | 0.97 | 0.97 |
| (lbs/in$^3$) | 0.035 | 0.035 | 0.035 |
| Filament/tow | 60 | 120 | 480 |
| Filament (dpf) | 10.8 | 10.0 | 10.0 |

Method of Bundle Construction

The fiber bundle is constructed using a mini-wire line extruder with a five horsepower motor and four heating zones. The fiber and resin are mixed at a weight ratio of 1. The "hard shell" or impregnated composite is controlled to 0.7-0.75 mm in thickness.

The extruder is equipped with a single screw and operated at a 3:1 compression ratio with a length/diameter ratio of 25. Mixing elements are not employed. The extruder zone temperature profile is 105° C. for Zone 1, 110° C. for Zone 2, 115° C. for Zone 3, and 120° C. for the die. The die and guider tip is set at 0.053 inches of aperture, and the screw is turned at 15 revolutions per minute (rpm). The fiber produced has an outer diameter of 0.072 inches (1.829 mm). The hard shell is measured as 0.71 mm in thickness.

Testing Methods

The tensile properties of the fiber bundle are measured according to the procedures of ASTM D638-03 and the Standard Test Method for Tensile Properties of Plastics, 2008 Annual Book of ASTM Standards, Section 8, Vol. 08.01, ASTM International, West Conshohocken, Pa., 2008.

Testing Results

Figure 2:
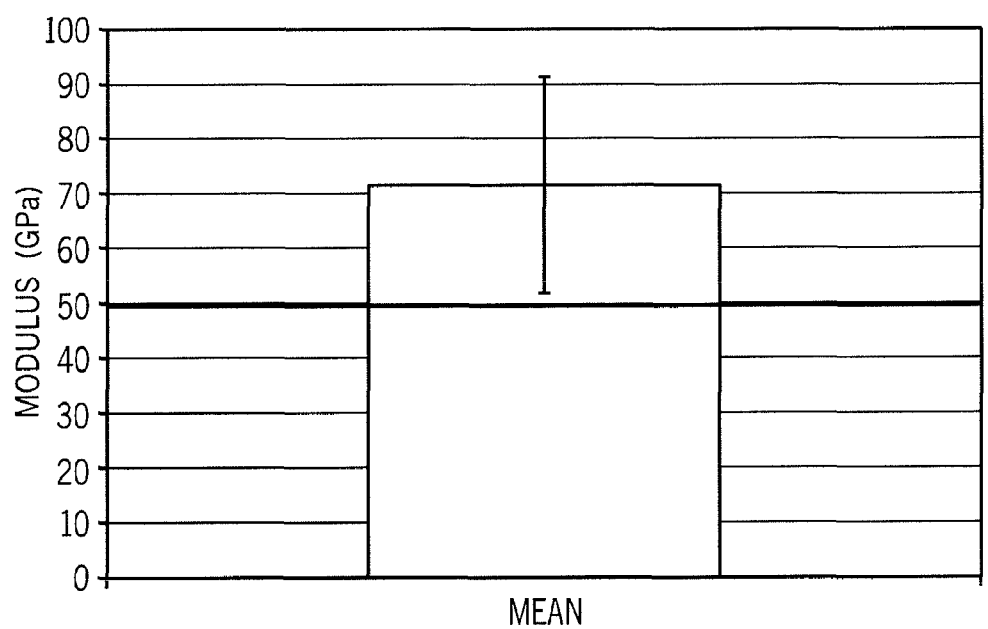
FIG. 2 is a graph reporting the modulus of the sample prepared in the example.
Figure 3:
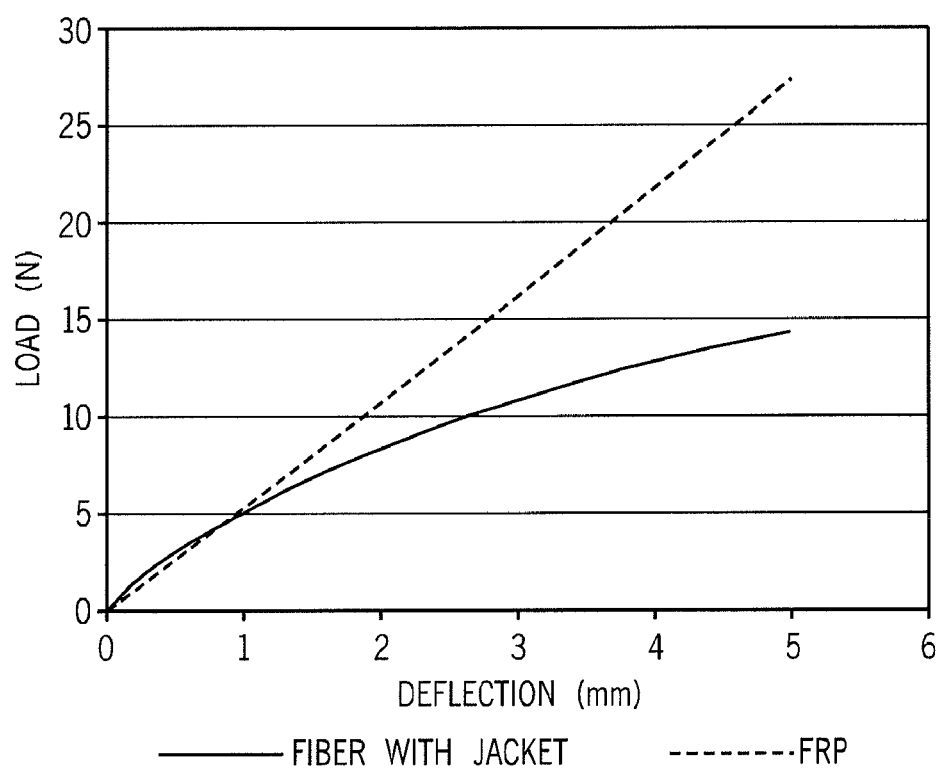
FIG. 3 is a graph reporting the result of a three-point bend test of the sample prepared in the example.

FIG. 2 reports the modulus data obtained. The result exceeds 49 GPa (which is the current specification for CRP/FRP used in optic fiber cable and is depicted by the black line in the graph). FIG. 3 reports the load-deflection testing data of a simple 3-point bend test with 2 inches of testing span. Tests are performed on the samples made in this example, and on conventional FRP samples (2.5 mm diameter) used in the industry today.

The load versus deflection data (three-point bending test) shown in FIG. 3 demonstrate that the samples made by this example are much more flexible than the conventional FRP fiber bundle (while its tensile modulus is still over the industrial specification as shown in FIG. 2).

Although the invention has been described with certain detail through the preceding description of the preferred embodiments, this detail is for the primary purpose of illustration. Many variations and modifications can be made by one skilled in the art without departing from the spirit and scope of the invention as described in the following claims.

What is claimed is:

1. A fiber optic cable comprising
   at least one optical fiber; and
   a fiber reinforced strength member having a circumference, the fiber reinforced strength member comprising a fiber bundle (10) having a radius, the fiber bundle comprising a plurality of fibers selected from the group consisting of polyolefin fibers, nylon fibers, polyester fibers, glass fibers, graphite fibers, quartz fibers, metal fibers, ceramic fibers, boron fiber, aluminum fibers and combinations thereof, wherein a portion of the fibers form an interior part of the bundle and a portion of the fibers form an exterior part of the bundle, wherein the exterior portion of the bundle is impregnated with a resin such that the fibers of the exterior part of the bundle and the resin form a fiber/resin composite (12) comprising an average thickness that is at least ⅓ of the radius of the bundle and the fiber/resin composite (12) encases the fibers that form the interior part of the fiber bundle and the fibers of the interior part of the bundle are loose, wherein the at least one optical fiber is not contained within the circumference of the fiber reinforced strength member.

2. The cable of claim 1 in which the fiber bundle (10) has a diameter, and the loose fibers within the bundle comprise at least $\frac{1}{10}^{th}$ of the average diameter of the bundle.

3. The cable of claim 2 in which the plurality of fibers comprise between 20 and 95 percent of the bundle (10) based on the total weight of the bundle (10).

4. The cable of claim 3 in which the resin comprises between 5 and 80 percent of the bundle (10) based on the total weight of the bundle (10).

5. The cable of claim 4 in which the plurality of fibers are polyolefin fibers.

6. The cable of claim 5 in which the resin is a polyolefin polymer.

7. The cable of claim 1 in which the fiber bundle (10) has a modulus of at least 49 GPa.

\* \* \* \* \*